US011709307B2

(12) United States Patent
Chen et al.

(10) Patent No.: US 11,709,307 B2
(45) Date of Patent: Jul. 25, 2023

(54) LIGHT SOURCE MODULE AND METHOD FOR MANUFACTURING THE SAME, AND BACKLIGHT MODULE AND DISPLAY DEVICE USING THE SAME

(71) Applicants: Radiant Opto-Electronics (Suzhou) Co., Ltd., Jiangsu (CN); Radiant Opto-Electronics Corporation, Kaohsiung (TW)

(72) Inventors: Chang-Yao Chen, Kaohsiung (TW); Chih-Chiang Chang, Kaohsiung (TW); Ya-Yin Tsai, Kaohsiung (TW)

(73) Assignees: Radiant Opto-Electronics (Suzhou) Co., Ltd., Jiangsu (CN); Radiany Opto-Electronics Corporation, Kaohsiung (TW)

( * ) Notice: Subject to any disclaimer, the term of this patent is extended or adjusted under 35 U.S.C. 154(b) by 126 days.

(21) Appl. No.: 17/445,829

(22) Filed: Aug. 24, 2021

(65) Prior Publication Data
US 2021/0382223 A1 Dec. 9, 2021

Related U.S. Application Data

(63) Continuation of application No. PCT/CN2020/070960, filed on Jan. 8, 2020.

(51) Int. Cl.
F21V 8/00 (2006.01)
(52) U.S. Cl.
CPC ......... *G02B 6/0051* (2013.01); *G02B 6/0061* (2013.01); *G02B 6/0065* (2013.01); *G02B 6/0068* (2013.01)

(58) Field of Classification Search
CPC .. G02B 6/0051; G02B 6/0061; G02B 6/0065; G02B 6/0068
See application file for complete search history.

(56) References Cited

U.S. PATENT DOCUMENTS

| 8,939,630 | B2 | 1/2015 | Kwon et al. |
| 2011/0050556 | A1* | 3/2011 | Bae ................... G02F 1/133603 362/235 |
| 2012/0287666 | A1 | 11/2012 | Kwon et al. |

FOREIGN PATENT DOCUMENTS

| CN | 101839423 A | 9/2010 |
| CN | 102691922 A | 9/2012 |

(Continued)

*Primary Examiner* — Andrew J Coughlin
*Assistant Examiner* — Jessica M Apenteng
(74) *Attorney, Agent, or Firm* — CKC & Partners Co., LLC

(57) ABSTRACT

A light source module and a method for manufacturing the same, and a backlight module and a display device using the same are provided. The method includes the following steps. A reference light source module is provided. The reference light source module comprises a substrate and plural light-emitting units arranged on the substrate. Then, plural optical trends between every two adjacent light-emitting units are obtained. Then, plural optical ratios between every two adjacent light-emitting units are calculated, in which each of the optical ratios is a ratio of each of the optical trends to a total reference optical trend of the reference light source module. Then, plural target distances are calculated according to the optical ratios and plural initial distances between every two adjacent light-emitting units are adjusted according to the target distances, thereby forming a target light source module.

20 Claims, 15 Drawing Sheets

(56) References Cited

FOREIGN PATENT DOCUMENTS

| | | |
|---|---|---|
| CN | 202419362 U | 9/2012 |
| CN | 103499072 A | 1/2014 |
| CN | 106847113 A | 6/2017 |
| CN | 108761908 A | 11/2018 |
| CN | 211086865 U | 7/2020 |
| KR | 20140082088 A | 7/2014 |
| TW | I456308 B | 10/2014 |
| TW | I657295 B | 4/2019 |
| WO | 2015/020032 A1 | 2/2015 |

\* cited by examiner

LIGHT SOURCE MODULE AND METHOD FOR MANUFACTURING THE SAME, AND BACKLIGHT MODULE AND DISPLAY DEVICE USING THE SAME

RELATED APPLICATIONS

This application is a continuation application of International Application No. PCT/CN2020/070960 filed on Jan. 8, 2020, which is incorporated herein by reference.

BACKGROUND

Field of Invention

The present disclosure relates to a light source module and its applications. More particularly, the present disclosure relates to a light source module and its applications that are applicable to a backlight module and a display device, and a method for manufacturing the light source module.

Description of Related Art

Referring to FIG. 1, FIG. 1 is a schematic structural diagram showing a conventional light source module 100. The light source module 100 is generally used in a direct-type backlight module and includes a substrate 110 and plural light-emitting units 120 arranged on the substrate 110 at equal intervals. Light generated by the light-emitting units 120 is further mixed through an optical film to form a surface light source.

Referring to FIG. 2, FIG. 2 shows a simulation result of optical trends generated by using the conventional light source module 100. As shown in FIG. 2, a central area of the light source module 100 has a higher brightness (such as a dark gray area near the central area of the light source module 100) because the central area collects light emitted from all directions. However, an edge area of the light source module 100 has a lower brightness (such as a light gray area near the edge area of the light source module 100) because the edge area only receives light emitted from partial directions. Therefore, if the light source module 100 is applied on a backlight module, the backlight module may be caused to have an appearance with high contrast and non-uniform brightness.

SUMMARY

An object of the invention is to provide a method for manufacturing a light source module for redistributing distances between any two adjacent light-emitting units according to optical trends generated by a light source module desired to be improved, thereby enabling a light source module to generate light with uniform brightness, thus improving the optical appearance of the backlight module.

According to the aforementioned object, a method for manufacturing a light source module is provided. The method includes the following steps. A reference light source module is provided. The reference light source module comprises a substrate and plural light-emitting units arranged on the substrate. Then, plural optical trends between every two adjacent light-emitting units are obtained. Then, plural optical ratios between every two adjacent light-emitting units are calculated, in which each of the optical ratios is a ratio of each of the optical trends to a total reference optical trend of the reference light source module. Then, plural target distances are calculated according to the optical ratios and plural initial distances between every two adjacent light-emitting units are adjusted according to the target distances, thereby forming a target light source module.

According to the aforementioned object, another method for method for manufacturing a light source module is provided. The method includes the following steps. A reference light source module is provided. The reference light source module comprises a substrate and plural light-emitting units arranged on the substrate, in which the light-emitting units are arranged along a first direction to form plural rows, and the light-emitting units are arranged along a second direction to form plural columns. Then, plural optical trends between every two adjacent light-emitting units are obtained. Then, plural optical ratios between every two adjacent light-emitting units are calculated, in which each of the optical ratios is a ratio of each of the optical trends to a total reference optical trend of the reference light source module. Then, plural target distances corresponding to every two adjacent light-emitting units in each row and in each column are calculated according to the optical ratios. Thereafter, plural initial distances between every two adjacent light-emitting units in each row are adjusted along the first direction according to the target distances, and plural initial distances between every two adjacent light-emitting units in each column are adjusted along the second direction according to the target distances, thereby forming a target light source module.

According to the aforementioned object, a light source module is provided. The light source module includes a substrate and plural light-emitting units disposed on the substrate. The light source module has a total reference optical trend and plural optical trends, each of the optical trends is obtained from an area between any two adjacent light-emitting units, and the total reference optical trend is the sum of the optical trends, wherein there are plural target distances between every two adjacent light-emitting units, and ratios of each of the target distances to a total distance of the light-emitting units are defined according to plural optical ratios between every two adjacent light-emitting units, wherein the optical ratios are defined by a ratio of each of the optical trends to the total reference optical trend.

According to the aforementioned object, another light source module is provided. The light source module includes a substrate and plural light-emitting units disposed on the substrate. The light source module has a total reference optical trend and plural optical trends, the optical trends are obtained from locations between any every adjacent light-emitting units arranged in a same row or a same column, and the total reference optical trend is the sum of the optical trends in the same row or the same column, wherein there are plural target distances between every two adjacent light-emitting units in the same row or in the same column, and ratios of each of the target distances to a total distance of the light-emitting units in the same row or the same column are defined according to plural optical ratios between every two adjacent light-emitting units, wherein the optical ratios are defined by a ratio of each of the optical trends to the total reference optical trend.

According to the aforementioned object, a backlight module is provided. The backlight module includes a light source module and an optical film. The light source module is manufactured by one the aforementioned methods. The optical film is disposed on the light source module.

According to the aforementioned object, a display device is provided. The display device includes the aforementioned backlight module and a display panel. The display panel is disposed on the optical film.

It is to be understood that the present disclosure uses a light source module desired to be improved as a reference light source module for re-adjusting distances between every two adjacent light-emitting units in the reference light source module according to optical trends generated by the reference light source module, thereby enabling an adjusted light source module to generate light with uniform distribution without increasing the number of light-emitting units.

BRIEF DESCRIPTION OF THE DRAWINGS

The invention can be more fully understood by reading the following detailed description of the embodiment, with reference made to the accompanying drawings as follows.

DETAILED DESCRIPTION

Figure 2:
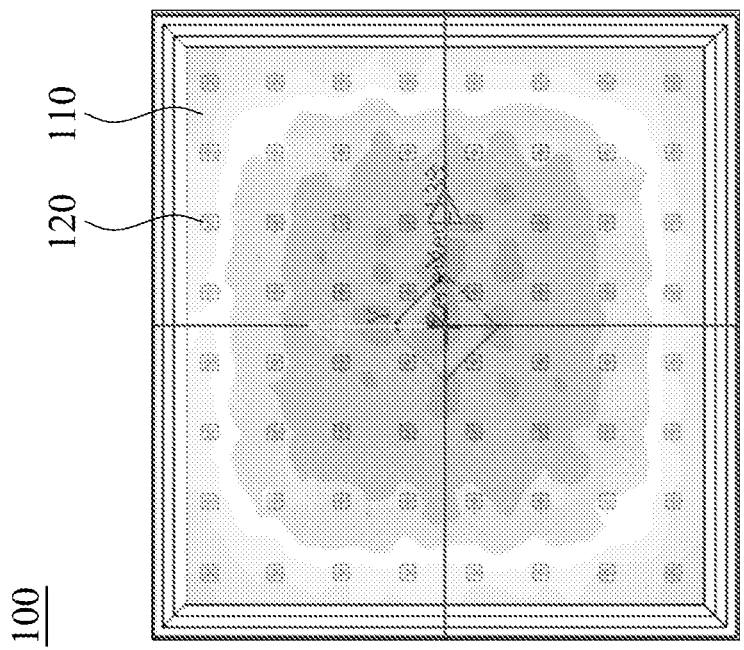
FIG. 2 shows a simulation result of optical trends generated by using the conventional light source module.
Figure 4:
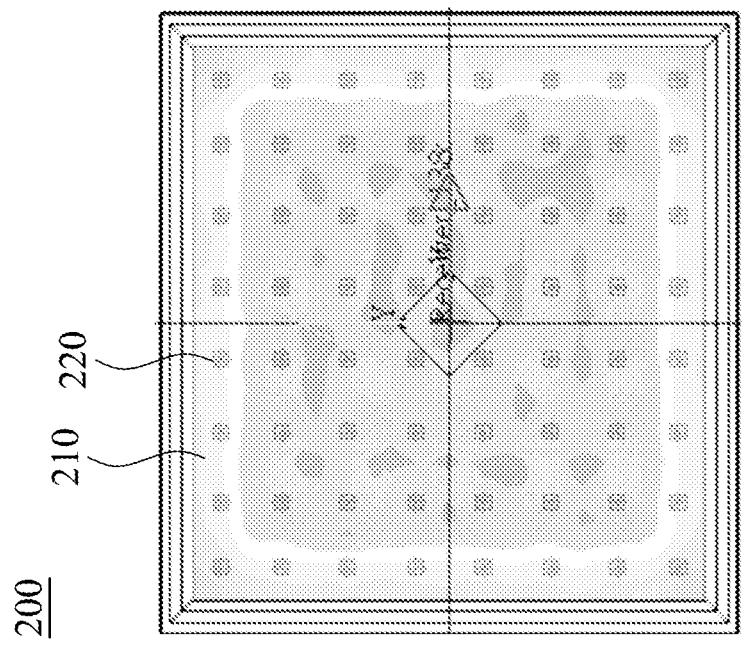
FIG. 4 shows a simulation result of optical trends generated by the light source module according to the first embodiment of the present disclosure.
Figure 3:
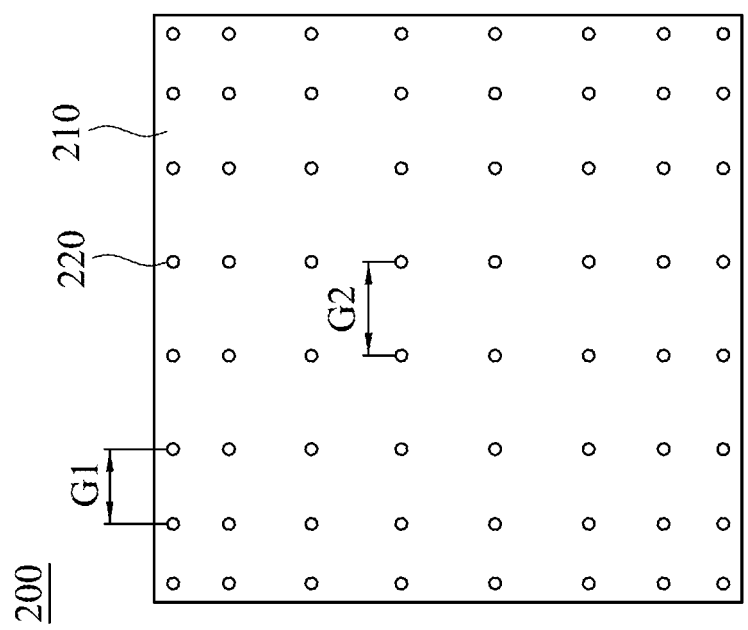
FIG. 3 is a schematic structural diagram showing a light source module in accordance with a first embodiment of the present disclosure.

Referring to FIG. 3 and FIG. 4, FIG. 3 is a schematic structural diagram showing a light source module 200 in accordance with a first embodiment of the present disclosure, and FIG. 4 shows a simulation result of optical trends generated by the light source module 200 according to the first embodiment of the present disclosure. In the present embodiment, the light source module 200 includes a substrate 210 and plural light-emitting units 220. The light-emitting units 220 are arranged on the substrate 210, and distances between every two adjacent light-emitting units 220 are not all equal to each other. In the present embodiment, distances G1 between every two adjacent light-emitting units 220 which are located closer to side edges of the substrate 210 are smaller than distances G2 between every two adjacent light-emitting units 220 which are located closer to a central area of the substrate 210. Therefore, the area near the central area of the light source module 200 as shown in FIG. 4 has apparently smaller dark gray areas than the area near the central area of the light source module 100 shown in FIG. 2, meaning that light emitted by the light source module 200 is more uniform than light emitted by the light source module 100.

Figure 5:
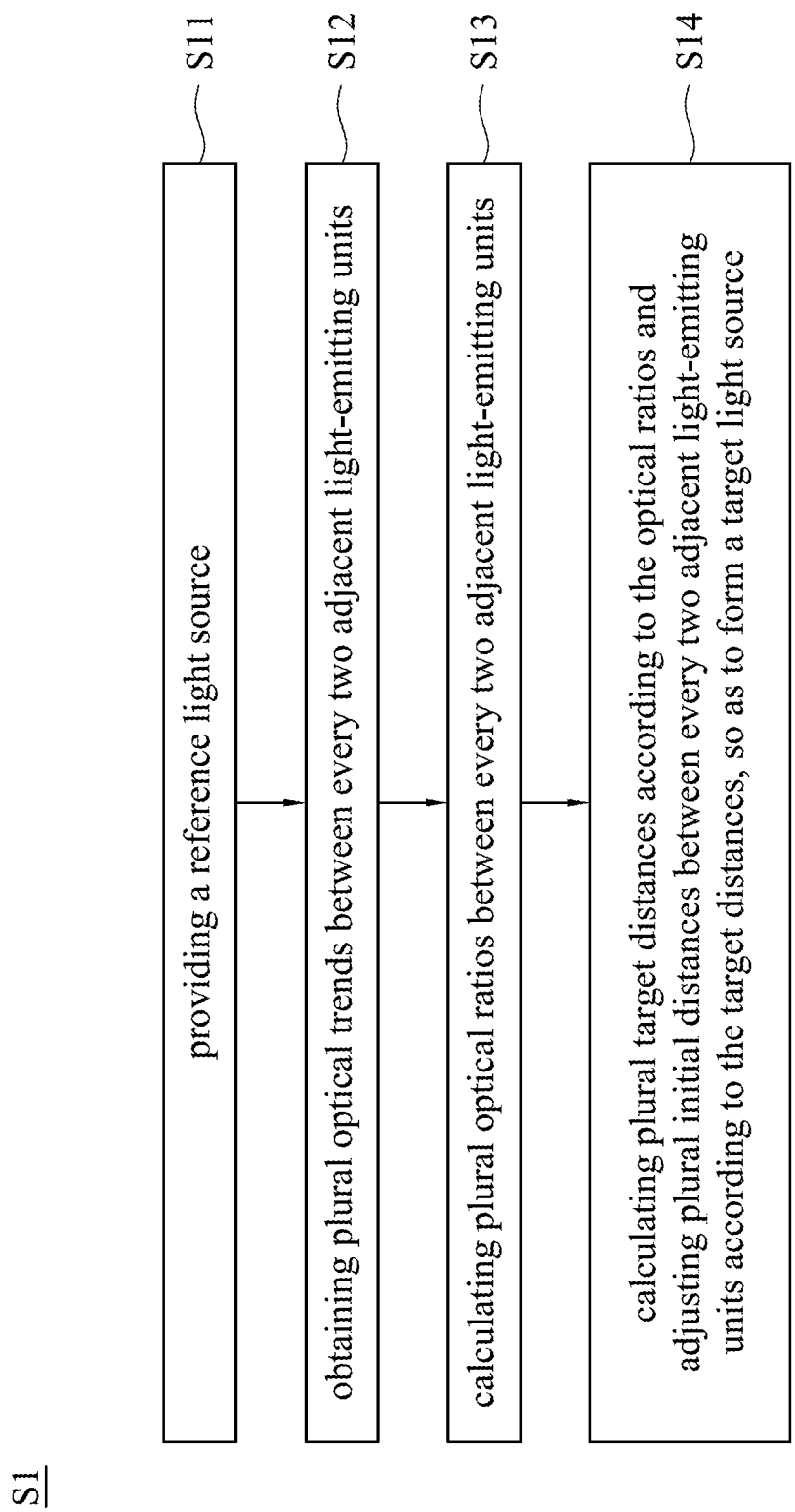
FIG. 5 is a flow chart of a method for manufacturing a light source module in accordance with an embodiment of the present disclosure.

In the present embodiment, the light source module 200 is manufactured by a method shown in FIG. 5. More specifically, in the light source module 200, distances between every two adjacent light-emitting units 220 are designed with reference to the optical trends generated by the light source module 100 shown in FIG. 1.

Figure 1:
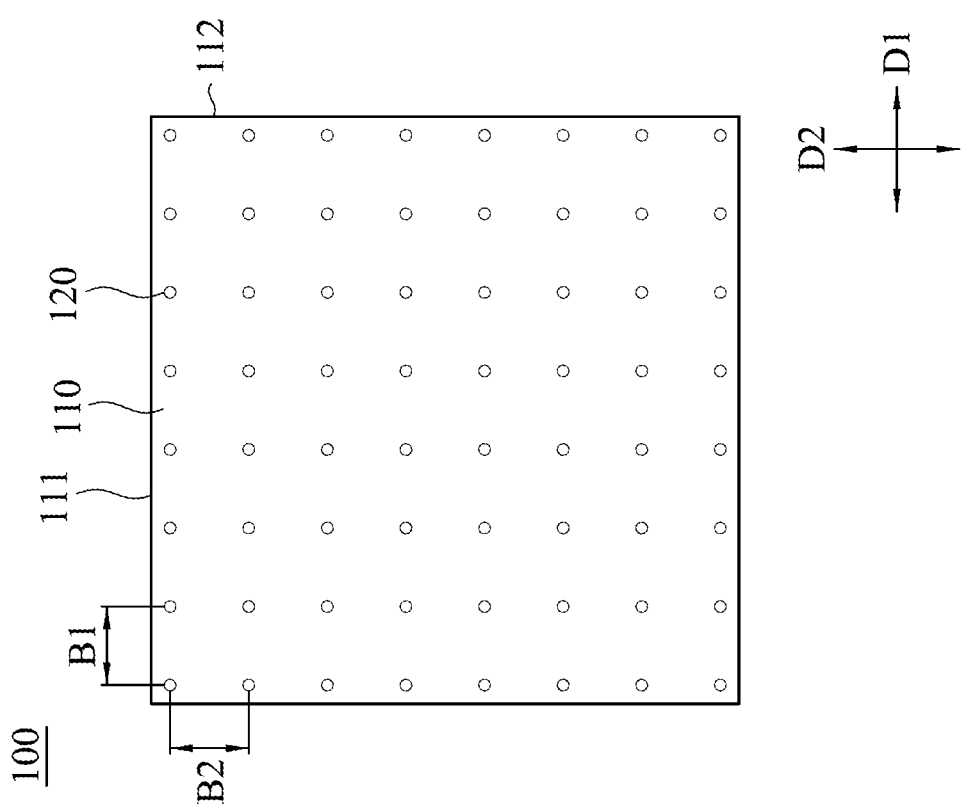
FIG. 1 is a schematic structural diagram showing a conventional light source module.

Referring to FIG. 1 and FIG. 5, FIG. 5 is a flow chart of a method S1 for manufacturing a light source module in accordance with an embodiment of the present disclosure. In the method S1 for manufacturing the light source module, a step S11 is first performed to provide a reference light source module. In the step S11, the light source module 100 of FIG. 1 is used as the reference light source module. As shown in FIG. 1, the light-emitting units 120 of the light source module 100 are arranged on the substrate 110 at equal intervals along a first direction D1 and a second direction D2. More specifically, a distance B1 is formed between any two adjacent light-emitting units 120 which are arranged along the first direction D1, and a distance B2 is formed between any two adjacent light-emitting units 120 which are arranged along the second direction D2. The distances B1 are equal to the distances B2.

As shown in FIG. 1 and FIG. 5, after the step S11 is performed, a step S12 is performed to obtain plural optical trends between every two adjacent light-emitting units 120. In some embodiments, the optical trends can be calculated according to equation (1), equation (2) or equation (3) that are expressed as follows:

$$f_i = \sqrt{\frac{Br_i}{\overline{Br_s}}} ; \quad (1)$$

$$f_i = \frac{Br_i}{\overline{Br}} ; \quad (2)$$

$$f_i = \frac{Br_i}{\sqrt{\frac{\sum_{n=1}^{i} Br_i^2}{n}}} ; \quad (3)$$

where $f_i$ represents the optical trend at an area i between any two adjacent light-emitting units 120, $Br_i$ represents a brightness value or a luminance value at the area i; $\overline{Br_s}$ represents an average brightness value or an average luminance value generated by a reference light source module (i.e. the light source module 100); $\overline{Br}$ represents an average brightness value or an average luminance value generated by the light-emitting units 120 in each row or in each column;

$$\sqrt{\frac{\sum_{n=1}^{i} Br_i^2}{n}}$$

is a root-mean-square brightness or luminance value generated by the light-emitting units 120; and n represents the number of spacings between every two adjacent light-emitting units 120. In the present embodiment, the brightness value and the luminance value are measured by a brightness meter and an illuminance meter respectively. It is noted that, in equation (1), the average brightness value or the average luminance value refers to an average value of a total brightness value or a total luminance value generated from all of the light-emitting units 120 in the light source module 100. In equation (2), the average brightness value or the average luminance value refers to an average value of a total brightness value or a total luminance value generated from the light-emitting units 120 arranged in a row or in a column. In one embodiment, the brightness values or the luminance values between every two adjacent light-emitting units 120 include the brightness values or the luminance values between any two adjacent light-emitting units 120 which are arranged in the same direction, that is, the brightness values or the luminance values between every two adjacent light-emitting units 120 arranged in the first direction D1 or in the second direction D2. It is noted that, parameters used in the present disclosure for optical trends are not limited to the brightness values or luminance values described above, and other parameters are also applicable to the disclosure as long as they can be used for measuring the brightness of the light-emitting units.

After the optical trends between every two adjacent light-emitting units are obtained, a step S13 is performed to calculate plural optical ratios between every two adjacent light-emitting units 120, in which each of the optical ratios is a ratio of each of the optical trends to a total reference optical trend of the reference light source module 100. After the optical ratio of each optical trend to the total reference optical trend is obtained, a step S14 is performed to adjust a relative position between any two adjacent light-emitting units 120 corresponding to the optical trend according to the optical ratio corresponding to the optical trend, so as to change the distances (initial distances) between any two adjacent light-emitting units 120, thereby forming the light source module 200 as shown in FIG. 3 (i.e., target light source module).

Referring to FIG. 1 and FIG. 5, in the step 14, a sum $\Sigma P_i$ of all the distances between every two adjacent light-emitting units 120 in the same row (or the same column) in the reference light source module (i.e., the light source module 100) is first calculated. Thereafter, the sum $\Sigma Pi$ is multiplied by the respective optical ratio of the optical trends between any two adjacent light-emitting units 120 in the same row (or the same column) to the total reference optical trend of the reference light source module (i.e., the light source module 100), so as to obtain plural target distances P'i, in which the calculated target distances P'i are the distances (e.g., the distance G1 or the distance G2) between every two adjacent light-emitting units 220 in the light source module 200. Therefore, each of the target distances P'i can be expressed as equation (4):

$$P'_i = \left(\sum P_i\right) \cdot \frac{f_i}{\sum f_i} ; \quad (4)$$

where $f_i$ represents the optical trend at the area i between any two adjacent light-emitting units 120, Pi represents an initial distance at the area i between any two adjacent light-emitting units in the reference light source module (e.g., the distance B1 or the distance B2 between the light-emitting units 120 of the light source module 100). It can be seen from equation (4) that, the target distances P'i are obtained by redistributing the sum $\Sigma Pi$ of all the distances between every two adjacent light-emitting units 120 in the same row (or in the same column) according to the optical ratio of each optical trend between any two adjacent light-emitting units 120 to the total reference optical trend.

Figure 7:
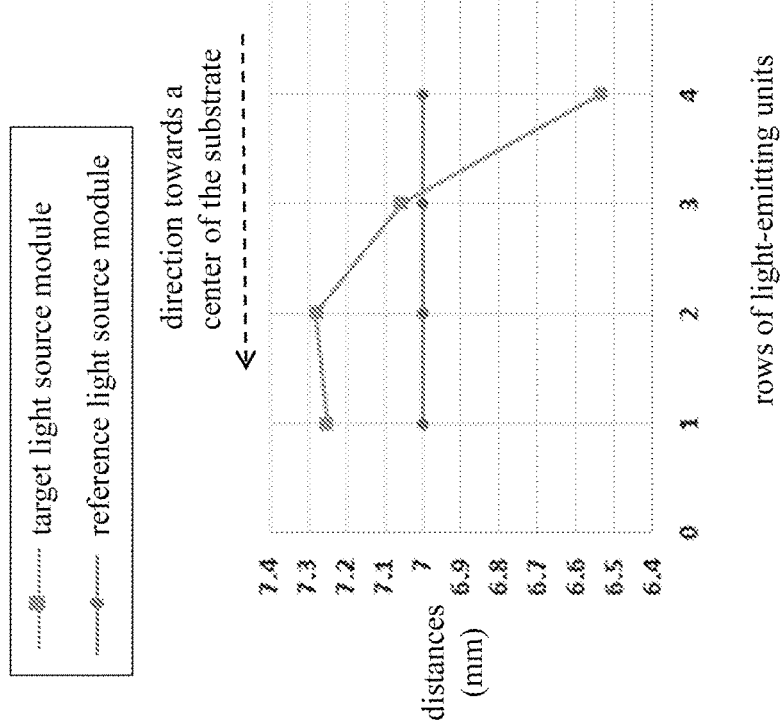
FIG. 7 is a schematic structural diagram showing a relationship between each of rows of light-emitting units and distances between light-emitting units in each row respectively in a target light source module and a reference light source module.
Figure 6:
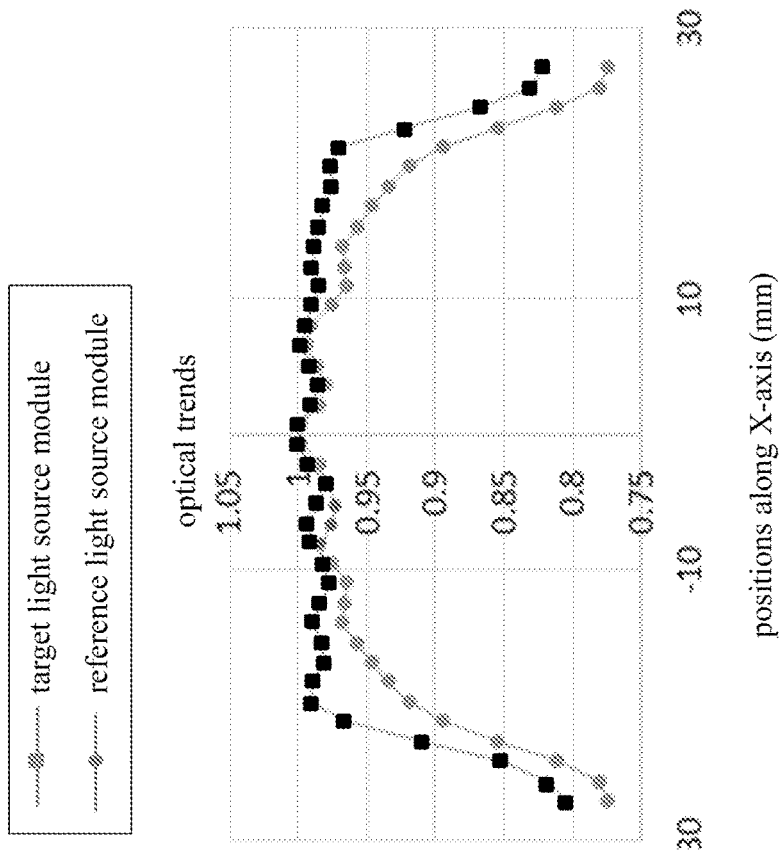
FIG. 6 shows simulation results of optical trends along X-direction respectively generated by a target light source module and a reference light source module.

In one example, referring to FIG. 2, FIG. 6 and FIG. 7, FIG. 6 shows simulation results of optical trends along X-direction respectively generated by the target light source module (i.e., the light source module 200) and the reference light source module (i.e., the light source module 100), and FIG. 7 is a schematic structural diagram showing a relationship between each of rows of light-emitting units and distances between light-emitting units in each row respectively in the target light source module and the reference light source module. Taking the reference light source module (i.e., the light source module 100 in FIG. 2) as an example, a center of the substrate 110 is considered as a coordinate origin, and there are four rows of light-emitting units 120 arranged along +X axis. As shown in FIG. 1 and FIG. 7, in each row of the light-emitting units 120, the distances B2 between every two adjacent light-emitting units 120 are 7 mm, and the optical trends generated therefrom can be expressed by a curve line of the of the reference light source module in FIG. 6. According to the optical trends generated by the reference light source module (i.e., the light source module 100), the target distances P'$_i$ which are respectively corresponding to the four rows of light-emitting units 120 are calculated to be 7.25 mm, 7.29 mm, 7.05 mm and 6.55 mm (as shown in FIG. 7), so that the calculated target distances P'$_i$ can be used to adjust relative positions of light-emitting units 120 in the four rows. The optical trends generated by the target light source module are shown in FIG. 6. As shown in FIG. 6, light generated by the target light source module is more uniform than light generated by the reference light source module.

From the above, the distances between every two adjacent light-emitting units 220 in the light source module 200 of the present disclosure are designed according to the optical trends generated by the light source module 100 as shown in FIG. 1. The design principle is first to standardize or normalize the optical trends between every two adjacent light-emitting units 120 in the light source module 100, and to calculate light contributions from every two adjacent light-emitting units 120 in the light source module 100, and then to adjust the distances between every two adjacent light-emitting units 120, so to obtain the light source module 220 of the present disclosure.

Referring to Table 1, in an example of a 6×6 matrix arrangement of plural light-emitting units, there are 5 spacings between 6 light-emitting units in a same row (or a same column), and each spacing is given a number from 1 to 5. Before adjustment, initial distances between every two adjacent light-emitting units are respectively 5 cm. Firstly, the light-emitting units in the same row (or the same column) closest to a side edge of the substrate are fixed, and then the optical trends fi and target distances P'i of each spacing are obtained according to the aforementioned equations (1) and (4). Similarly, equations (2) and (3) can also be used to calculate the optical trends fi for redistributing the distances between every two adjacent light-emitting units. In addition, the light-emitting units arranged in different directions can also be standardized or normalized to obtain the target distances P'i in different directions. In some examples, if only the light generated by the light-emitting units in one row (or one column) is considered, equation (2) or equation (3) can be used to calculate the optical trends between light-emitting units in the one row (or the one column), and equation (4) is then used to calculate the target distances P'i. If light contributions of the light-emitting units from more than two directions are considered, equation (1) can be used to calculate the optical trends between light-emitting units, and equation (4) is then used to calculate the target distances P'i.

| Spacing number | Bri | equation (1) optical trend fi | target distance P'i(cm) | equation (2) optical trend fi | target distance P'i(cm) |
| --- | --- | --- | --- | --- | --- |
| 1 | 93 | 98.53% | 4.93 | 97.08% | 4.85 |
| 2 | 98 | 101.14% | 5.06 | 102.30% | 5.11 |
| 3 | 100 | 102.17% | 5.11 | 104.38% | 5.22 |
| 4 | 96 | 100.10% | 5.01 | 100.21% | 5.01 |
| 5 | 92 | 98.00% | 4.90 | 96.03% | 4.80 |
| | SUM | 499.94% | 25 | 500.00% | 25 |

Figure 8:
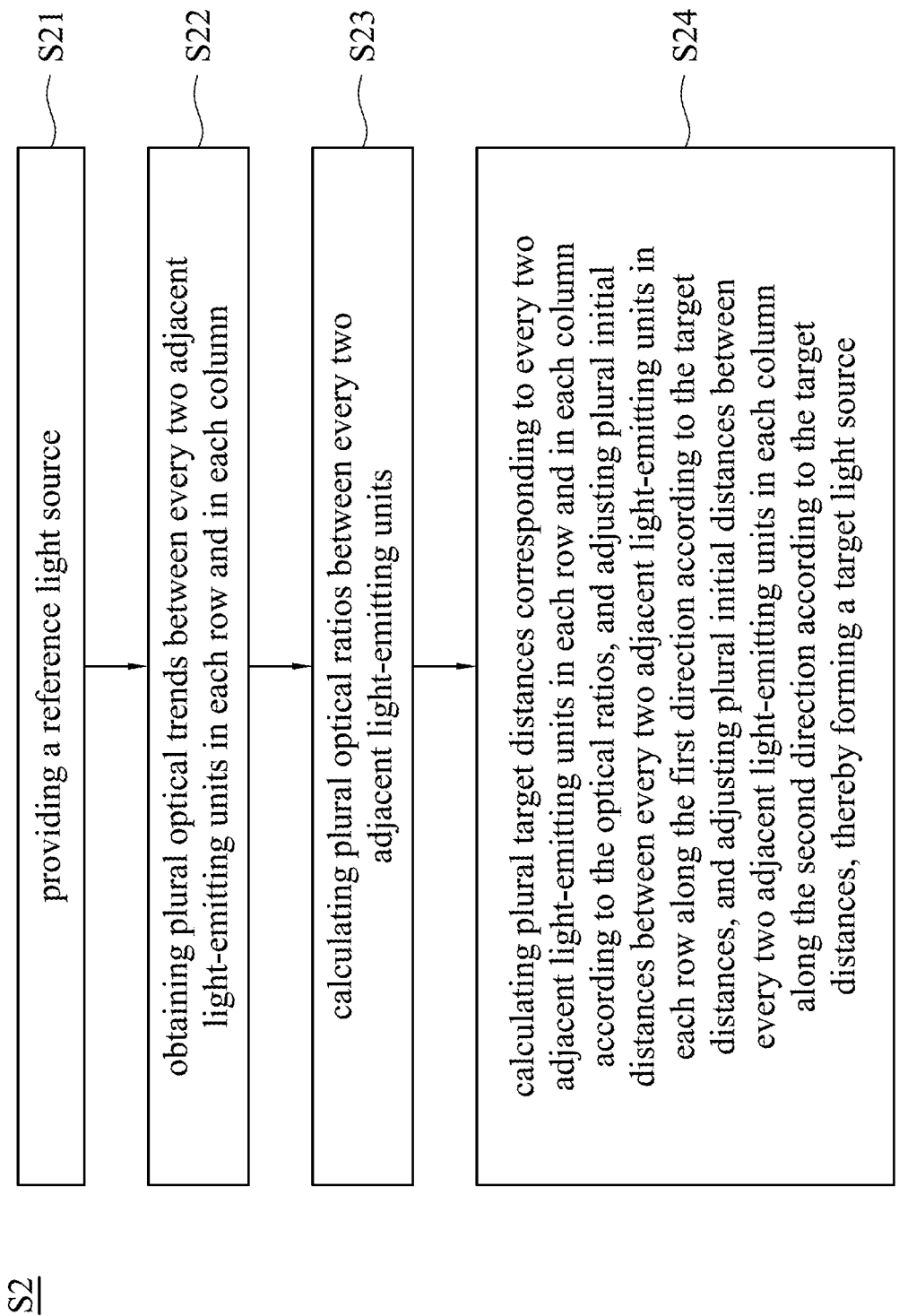
FIG. 8 is another flow chart of a method for manufacturing a light source module in accordance with an embodiment of the present disclosure.
Figure 9:
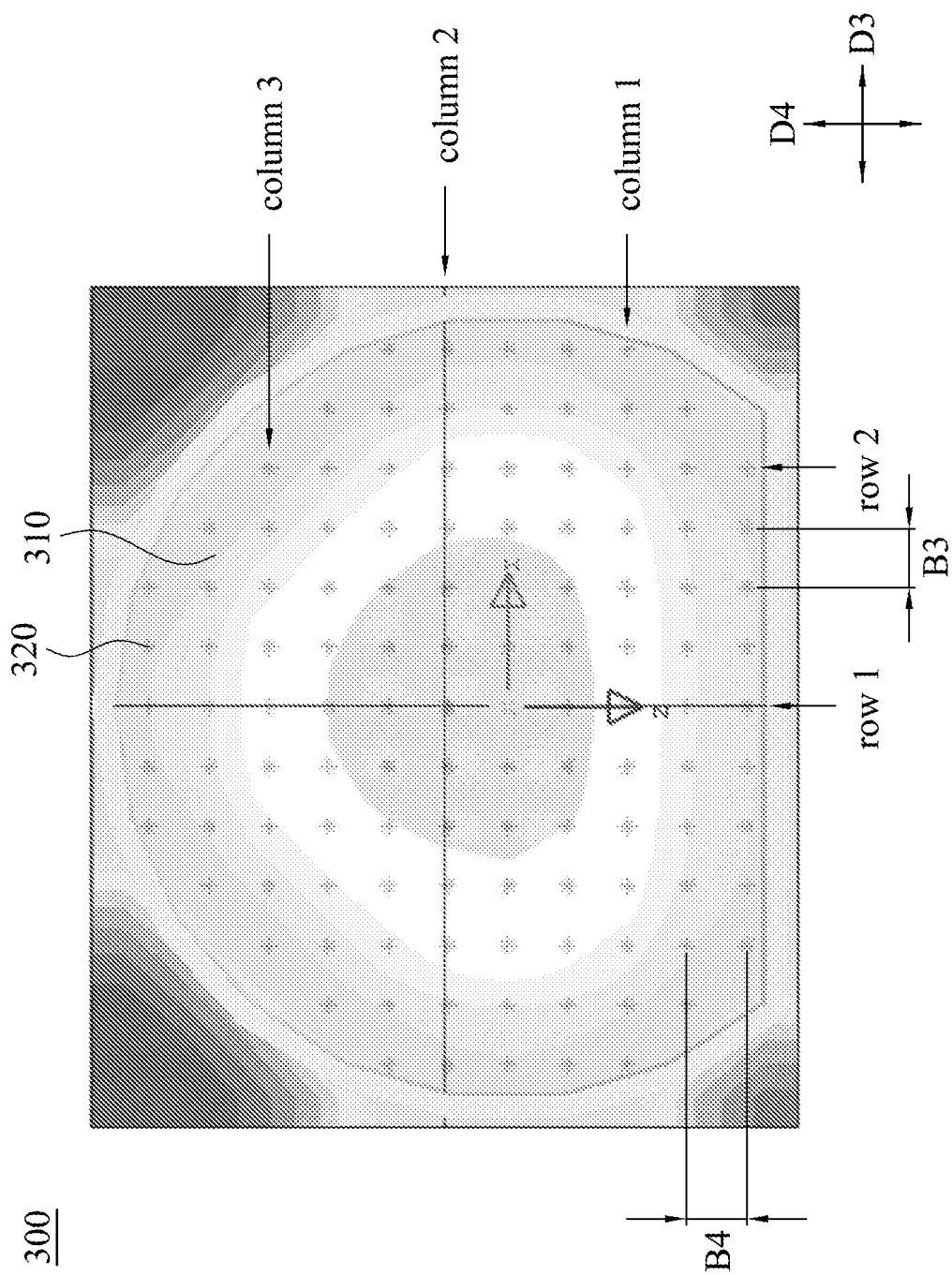
FIG. 9 shows a simulation result of optical trends generated by a reference light source module.

It is noted that, in addition to a rectangle substrate as shown in the present embodiments, the substrate of the light source module may have other shapes, such as a circle substrate, an oval substrate or a fan-shape substrate. Regardless of the shape of the light source module, methods shown in FIG. 5 and FIG. 8 are applicable to manufacture different shapes of light source modules. Referring to FIG. 8 and FIG. 9, FIG. 8 is another flow chart of a method S2 for manufacturing a light source module 400 in accordance with an embodiment of the present disclosure, and FIG. 9 shows a simulation result of optical trends generated by a reference light source module 300. In the method S2 for manufacturing the light source module 400, a step S21 is first performed to provide the reference light source module 300 as shown in FIG. 9. As shown in FIG. 9, the reference light source module 300 includes a substrate 310 and plural light-emitting units 320 arranged on the substrate 310 at equal intervals along a first direction D3 and a second direction D4. More specifically, the light-emitting units 320 are arranged to form plural columns parallel to the first direction D3 and are arranged to form plural rows parallel to the second direction D4. In these light-emitting units 320, there is a distance B3 between any two adjacent light-emitting units 320 arranged along the first direction D3, and there is a distance B4 between any two adjacent light-emitting units 320 arranged along the second direction D4. The distance B3 are equal to the distance B4. Therefore, as shown in FIG. 9, a central area of the reference light source module 300 has a higher brightness (such as a dark gray block near the central area of the reference light source module 300), which causes a backlight module to have appearance with high contrast and non-uniform brightness.

After the step S21 is performed, a step S22 is performed to obtain plural optical trends between every two adjacent light-emitting units 320 in each row or in each column. In some embodiments, the optical trends may be calculated according to one of the aforementioned equations (1)-(3).

Figures 10, 11:
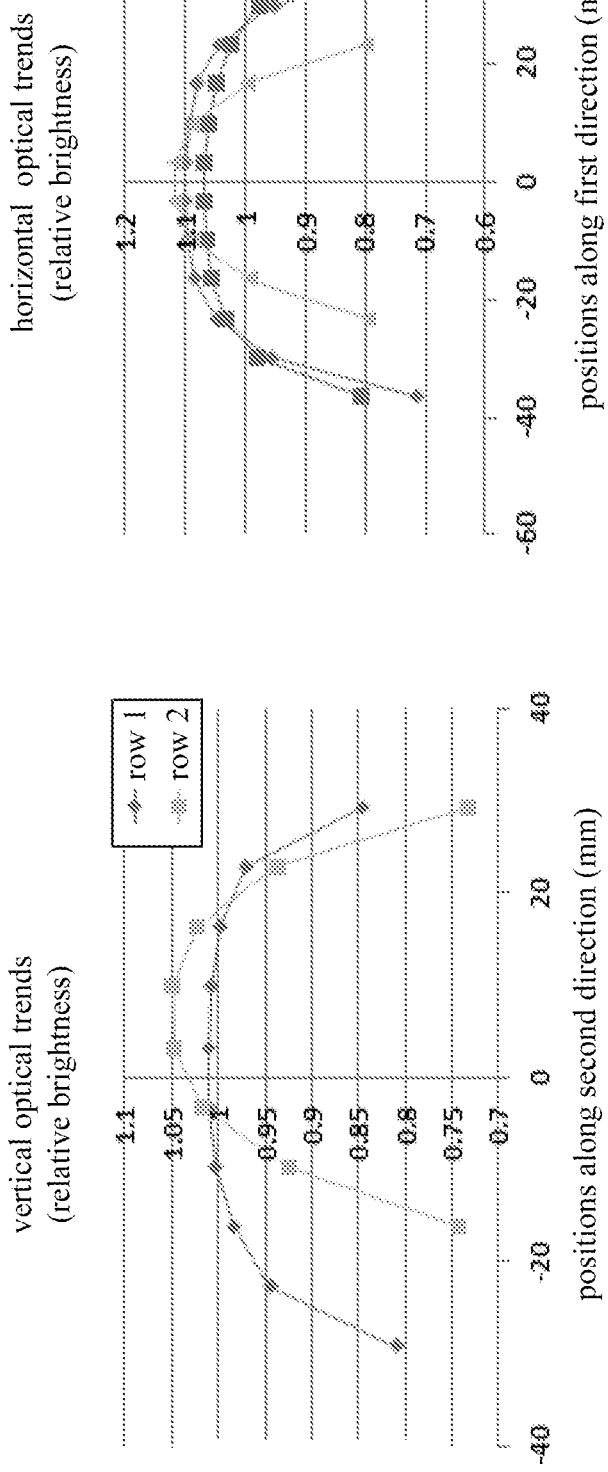
FIG. 10 shows simulation results of optical trends generated from light-emitting units in two rows parallel to a second direction in the reference light source module of FIG. 9.
FIG. 11 shows simulation results of optical trends generated from the light-emitting units in three columns parallel to a first direction in the reference light source module of FIG. 9.

It is noted that, the optical trends are relative values, which refer to the relationships between brightness value (luminance value) of a portion of area and the total brightness value (or the total luminance value). In the step 22, the optical trends are calculated according to equation (2). The optical trends of each row (or each column) are obtained by dividing the brightness value (or the illuminance value) between every two adjacent light-emitting units 320 in each row or column by the total brightness value (or the total illuminance value). For example, as shown in FIG. 10 and FIG. 11, FIG. 10 shows simulation results of optical trends generated from the light-emitting units 320 in two rows parallel to the second direction D4 in the reference light source module 300 of FIG. 9, and FIG. 11 shows simulation results of optical trends generated from the light-emitting units 320 in three columns parallel to the first direction D3 in the reference light source module 300 of FIG. 9. In other embodiments, the step S22 in FIG. 8 can be replaced with the step S12 in FIG. 5, that is, the optical trends are square roots of the values respectively calculated by dividing the brightness values between every two adjacent light-emitting units 320 by the average brightness value of the reference light source module 300.

Figure 12:
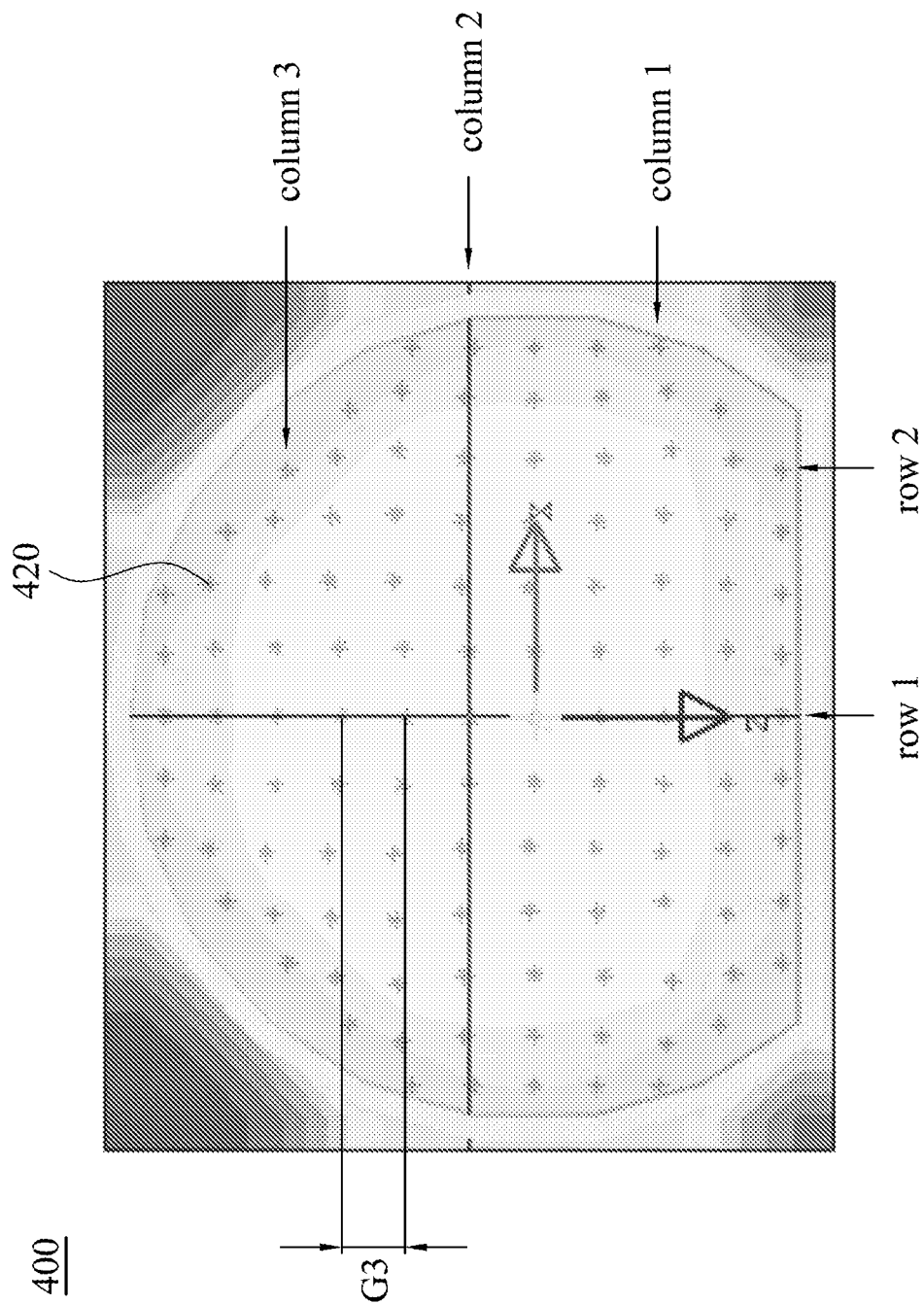
FIG. 12 shows a simulation result of optical trends generated by a light source module of a second embodiment of the present disclosure.

After the optical trends between every two adjacent light-emitting units 320 in each row and each column are obtained, a step S23 is performed to calculate optical ratios between every two adjacent light-emitting units 320, in which each of the optical ratios is a ratio of each of the optical trends of any two adjacent light-emitting units 320 in the same row or in the same column to a total reference optical trend in the same row or in the same column of the reference light source module 300. After the optical ratio of each optical trend to the total reference optical trend is obtained, a step S24 is performed to adjust a relative position between any two adjacent light-emitting units 320 corresponding to each optical trend in each row or in each column according to the optical ratio corresponding to the optical trend, thereby forming the light source module 400 as shown in FIG. 12 (i.e., target light source module).

In the step S24, a sum $\Sigma P_i$ of all the distances between every two adjacent light-emitting units 320 in the each of the rows and columns in the reference light source module 300 is first calculated. Take the light-emitting units 320 in "row 1" in the reference light source module 300 of FIG. 9 as an example, the sum Σ P$_i$ of all the distances between every two adjacent light-emitting units 320 in "row 1" is calculated. Thereafter, the sum Σ P$_i$ in "row 1" is multiplied by respective optical ratios of the optical trends between every two adjacent light-emitting units 320 in "row 1" to a total reference optical trend of "row 1" in the reference light source module, so as to obtain plural target distances P'i, in which the calculated target distances P'i are the distances (i.e., distance G3) between any every adjacent light-emitting units 420 in "row 1" of the light source module 400. Therefore, each of the target distances P'i can be expressed as an equation (5):

$$P'_i = \left(\sum P_i\right) \cdot \frac{f_i}{\sum f_i}; \quad (5)$$

In equation (5), fi represents the optical trend at an area i between any two adjacent light-emitting units 320, Pi represents an initial distance at the area i between any two adjacent light-emitting units 320 in each row or in each column in the reference light source module 300 (e.g., the distance B3 or the distance B4 between the light-emitting units 320). It can be seen from equation (5) that, the target distances P'i are obtained by redistributing the sum Σ Pi of all the distances between every two adjacent light-emitting units 120 in the same row (or in the same column) according to the optical ratio of each optical trend between any two adjacent light-emitting units 120 in the same row (or in the same column) to the total reference optical trend in the same row (or in the same column).

Figures 13, 14:
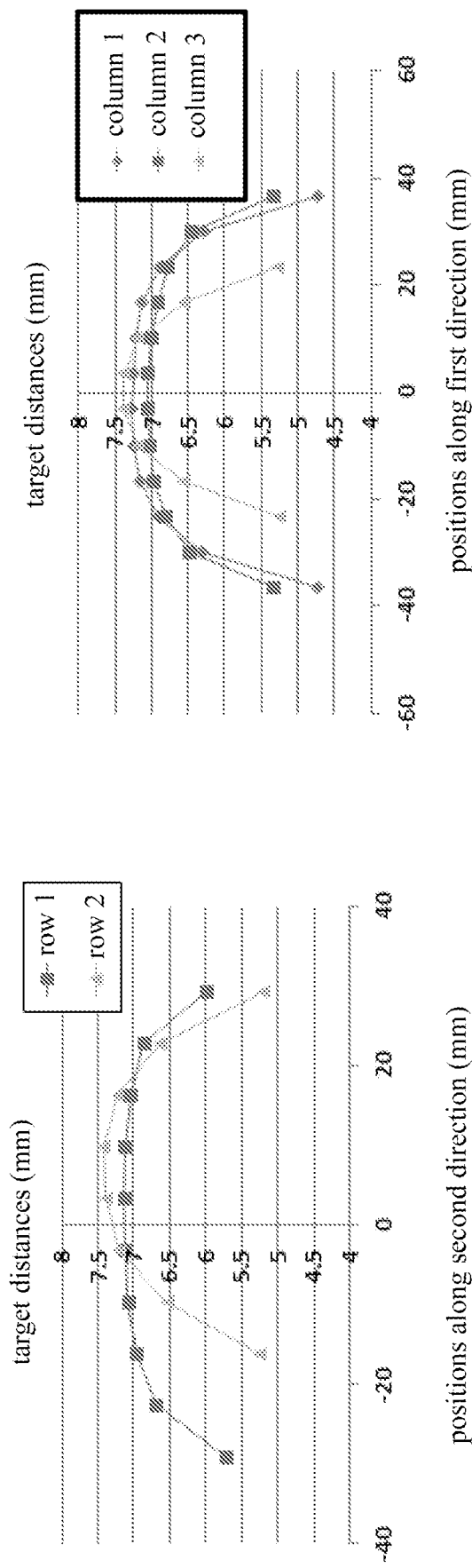
FIG. 13 shows target distances between the light-emitting units in two rows parallel to the second direction calculated according to the optical trends shown in FIG. 10.
FIG. 14 shows target distances between the light-emitting units in three columns parallel to the first direction calculated according to the optical trends shown in FIG. 11.

In one example, referring to FIG. 9 to FIG. 14, in which FIG. 13 shows target distances between the light-emitting units in two rows parallel to the second direction D4 calculated according to the optical trends shown in FIG. 10, and FIG. 14 shows target distances between the light-emitting units in three columns parallel to the first direction D3 calculated according to the optical trends shown in FIG. 11. In the reference light source module 300 as shown in FIG. 9, the light-emitting units 320 are arranged at equal intervals, and the distances B3 and B4 between every two adjacent light-emitting units 320 are 6.6 mm. Therefore, the optical trends respectively generated from the light-emitting units 320 in "row 1" and "row 2" of the reference light source module 300 can be expressed by curve lines of in FIG. 10, and the optical trends respectively generated from the light-emitting units 320 in "column 1", "column 2" and "column 3" of the reference light source module 300 can be expressed by curve lines of in FIG. 11.

As shown in FIG. 13, the target distances corresponding to "row 1" and "row 2" are respectively calculated according to the aforementioned equation (5) according to the optical trends generated by the reference light source module 300. As shown in FIG. 14, the target distances corresponding to "column 1", "column 2" and "column 3" are respectively calculated according to the aforementioned equation (5) according to the optical trends generated by the reference light source module 300. Therefore, relative positions of the light-emitting units 320 in "column 1", "column 2" and "column 3" can be respectively adjusted along their arranging directions according to the target distances, and relative positions of the light-emitting units 320 in "row 1" and "row 2" can be respectively adjusted along their arranging directions according to the target distances, thereby forming a target light source module 400. The optical trends generated by the target light source module 400 are shown in FIG. 12. As shown in FIG. 12, light generated by the target light source module 400 is more uniform than light generated by the reference light source module 300 as show in FIG. 9.

Figure 15:
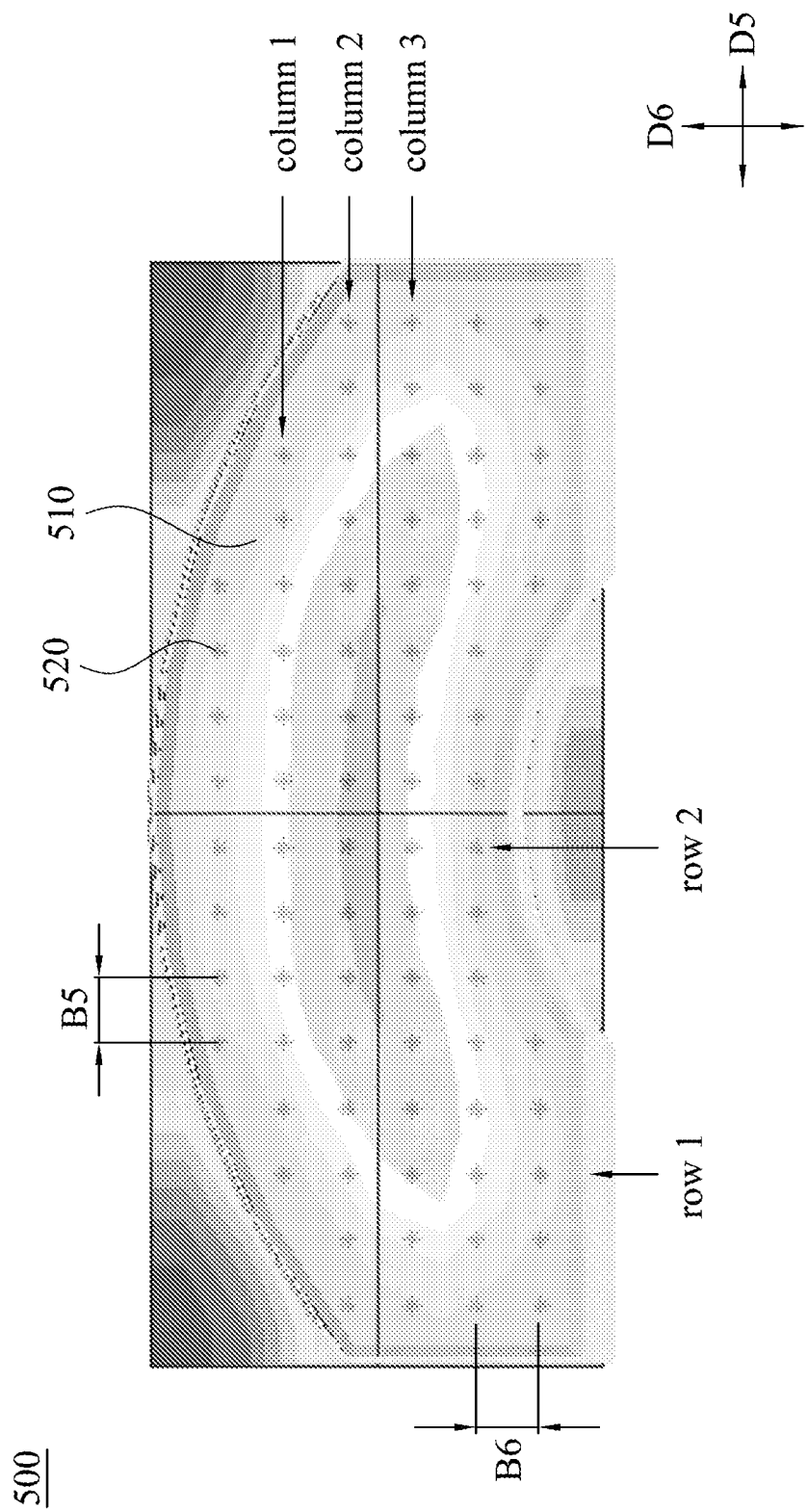
FIG. 15 shows a simulation result of optical trends generated by another reference light source module.

Another example is used to describe the method S2 shown in FIG. 8 to manufacture a fan-shaped light source module 600. Referring to FIG. 8 and FIG. 15, FIG. 15 shows a simulation result of optical trends generated by a reference light source module 500. In the method S2 shown in FIG. 8, a step S21 is first performed to provide the reference light source module 500 as shown in FIG. 15. As shown in FIG. 15, the reference light source module 500 includes a substrate 510 and plural light-emitting units 520 arranged on the substrate 510 at equal intervals along a first direction D5 and a second direction D6. More specifically, the light-emitting units 520 are arranged to form plural columns parallel to the first direction D5 and are arranged to form plural rows parallel to the second direction D6. In these light-emitting units 520, there is a distance B5 between any two adjacent light-emitting units 520 arranged along the first direction D5, and there is a distance B6 between any two adjacent light-emitting units 520 arranged along the second direction D6. Therefore, as shown in FIG. 15, a central area of the reference light source module 500 has a higher brightness near (such as a dark gray area near the central area of the reference light source module 500), which causes a backlight module to have appearance with high contrast and non-uniform brightness.

Figures 16, 17:
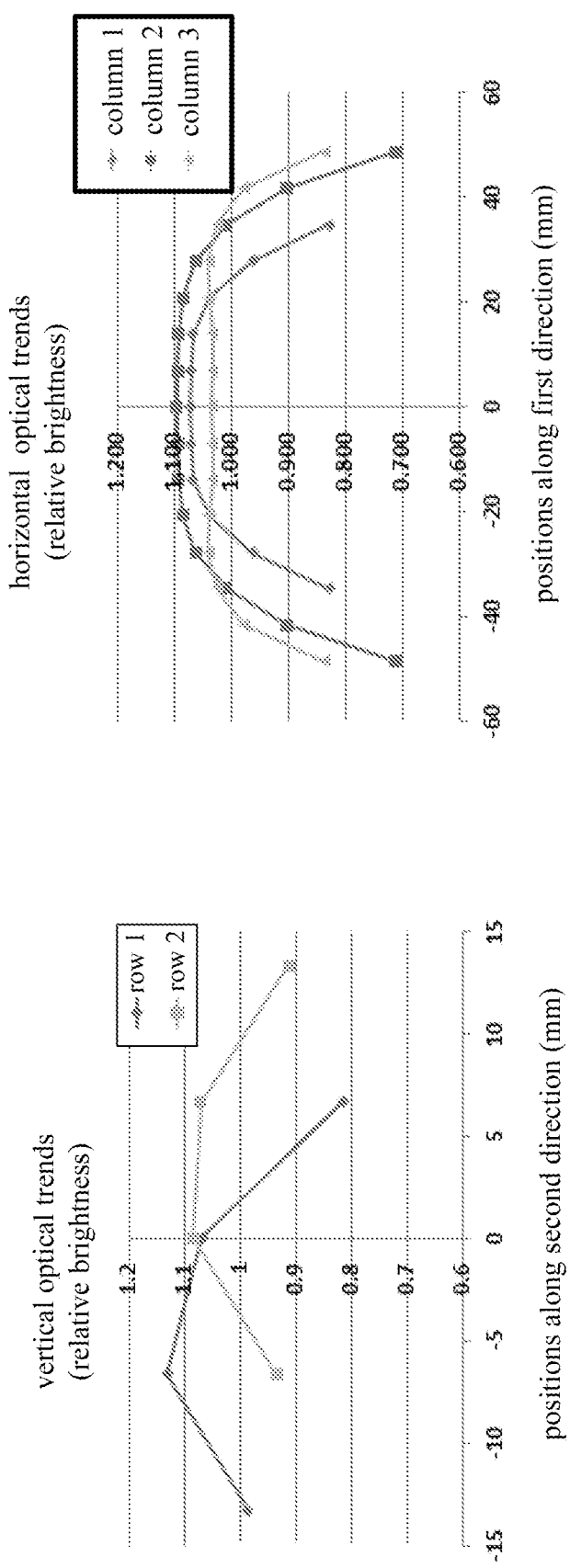
FIG. 16 shows simulation results of optical trends generated from the light-emitting units in two rows parallel to a second direction in the reference light source module of FIG. 15.
FIG. 17 shows simulation results of optical trends generated from the light-emitting units in three columns parallel to a first direction in the reference light source module of FIG. 15.

After the step S21 is performed, the step S22 is performed to respectively obtain plural optical trends between every two adjacent light-emitting units 520 in each row and each column. In some embodiments, the optical trends may be calculated according to one of the aforementioned equations (2) and (3). Referring to FIG. 16 and FIG. 17, FIG. 16 shows simulation results of optical trends generated from the light-emitting units 520 in two rows parallel to the second direction D6 in the reference light source module 500 of FIG. 15, and FIG. 17 shows simulation results of optical trends generated from the light-emitting units 520 in three columns parallel to the first direction D5 in the reference light source module 500 of FIG. 15. The optical trends in each row and in each column can be calculated according to the relative relationship between the brightness values.

Figure 18:
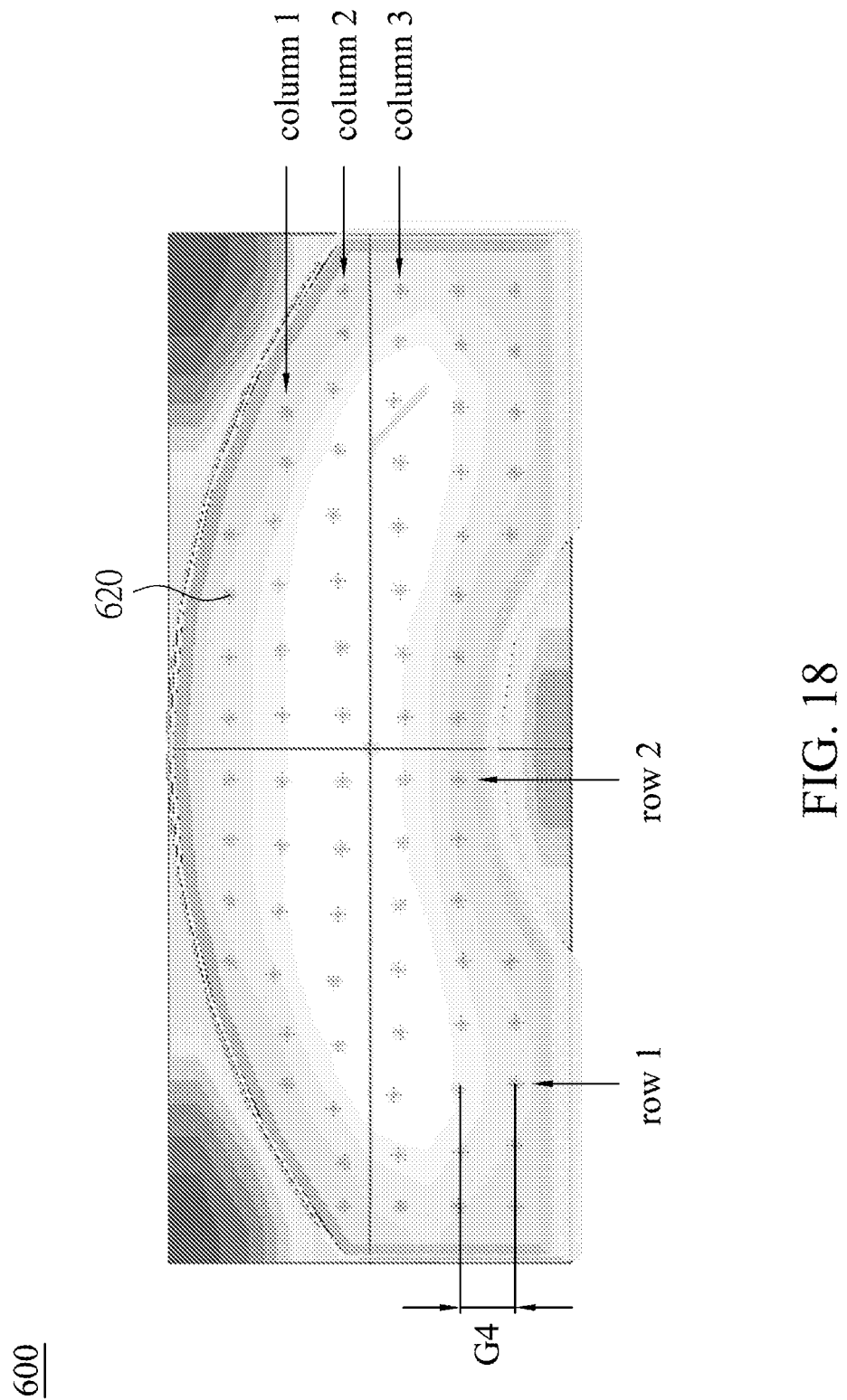
FIG. 18 is a schematic structural diagram showing a light source module in accordance with a third embodiment of the present disclosure.

After the optical trends between every two adjacent light-emitting units 520 in each row and each column are obtained, the step S23 is performed to calculate plural optical ratios between every two adjacent light-emitting units 320 in each row and each column, in which each of the optical ratios is a ratio of each of in the optical trends of any two adjacent light-emitting units 520 in the same row or in the same column to a total reference optical trend in the same row or in the same column of the reference light source module 500. After the optical ratio of each optical trend to the total reference optical trend i is obtained, the step S24 is performed to adjust a relative position between any two adjacent light-emitting units 520 corresponding to each optical trend in each row or in each column according to the optical ratio, corresponding to the optical trend, thereby forming the light source module 600 as shown in FIG. 18 (i.e., target light source module).

In the step S24, a sum Σ P$_i$ of all the distances between every two adjacent light-emitting units 520 in each of the rows and columns in the reference light source module 500 is first calculated. Take the light-emitting units 520 in "row 1" in the reference light source module 500 of FIG. 15 as an example, the sum Σ P$_i$ of all the distances between every two adjacent light-emitting units 520 in "row 1" is calculated. Thereafter, the sum Σ P$_i$ in "row 1" is multiplied by respective optical ratio of each of the optical trends between any two adjacent light-emitting units 520 in "row 1" to a total reference optical trend of "row 1" in the reference light source module 500, so as to obtain plural target distances P'i, in which the calculated target distances P'i are used as the distances (i.e., distance G4) between every two adjacent light-emitting units 620 in "row 1" of the light source module 600 in FIG. 18.

Figure 20:
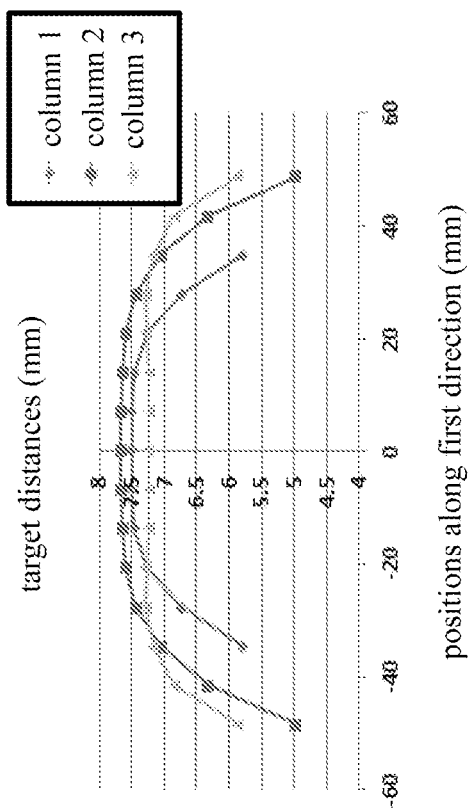
FIG. 20 shows target distances between the light-emitting units parallel in three columns parallel to the first direction calculated according to the optical trends shown in FIG. 17.
Figure 19:
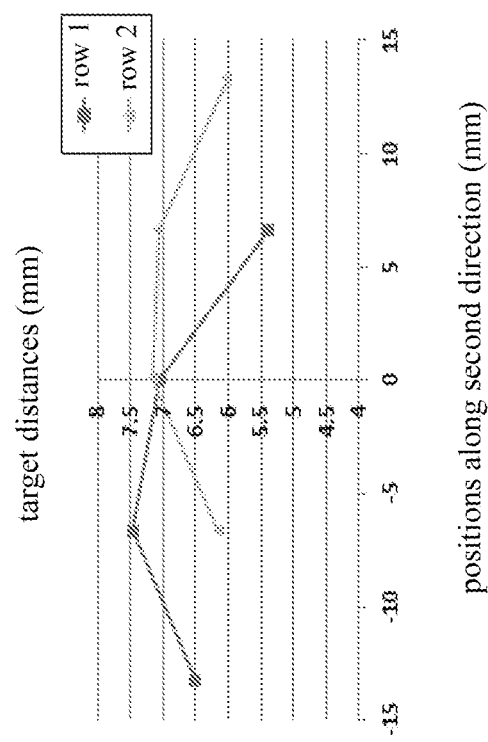
FIG. 19 shows target distances between the light-emitting units in two rows parallel to the second direction calculated according to the optical trends shown in FIG. 16.

Referring to FIG. 15 to FIG. 20, in which FIG. 19 shows target distances between the light-emitting units in two rows parallel to the second direction D6 calculated according to the optical trends shown in FIG. 16, and FIG. 20 shows target distances between the light-emitting units parallel in three columns parallel to the first direction D5 calculated according to the optical trends shown in FIG. 17. In the reference light source module 500 as shown in FIG. 15, the light-emitting units 520 are arranged at equal intervals along the second direction D6, and the distances B6 between every two adjacent light-emitting units 520 are 6.6 mm. Therefore, the optical trends respectively generated from the light-emitting units 520 in "row 1" and "row 2" of the reference light source module 500 can be expressed by curve lines of in FIG. 16. Similarly, the light-emitting units 520 are arranged at equal intervals along the first direction D5, and the distances B5 between every two adjacent light-emitting units 520 are 7 mm. Therefore, the optical trends respectively generated from the light-emitting units 520 in "column 1", "column 2" and "column 3" of the reference light source module 500 can be expressed by curve lines of in FIG. 17.

As shown in FIG. 19, the target distances corresponding to "row 1" and "row 2" are calculated according to the aforementioned equation (5) according to the optical trends generated by the reference light source module 500. As shown in FIG. 20, the target distances corresponding to "column 1", "column 2" and "column 3" are calculated according to the aforementioned equation (5) according to the optical trends generated by the reference light source module 500. Therefore, relative positions of the light-emitting units 520 in "column 1", "column 2" and "column 3" can be respectively adjusted along their arranging directions according to the target distances, and relative positions of the light-emitting units 520 in "row 1" and "row 2" can be respectively adjusted along their arranging directions of "row 1" and "row 2" according to the target distances, thereby forming a target light source module 600 as shown in FIG. 18. The optical trends generated by the target light source module 600 are shown in FIG. 18. As shown in FIG. 18, light generated by the target light source module 600 is more uniform than light generated by the reference light source module 500 as show in FIG. 15.

Figure 21:
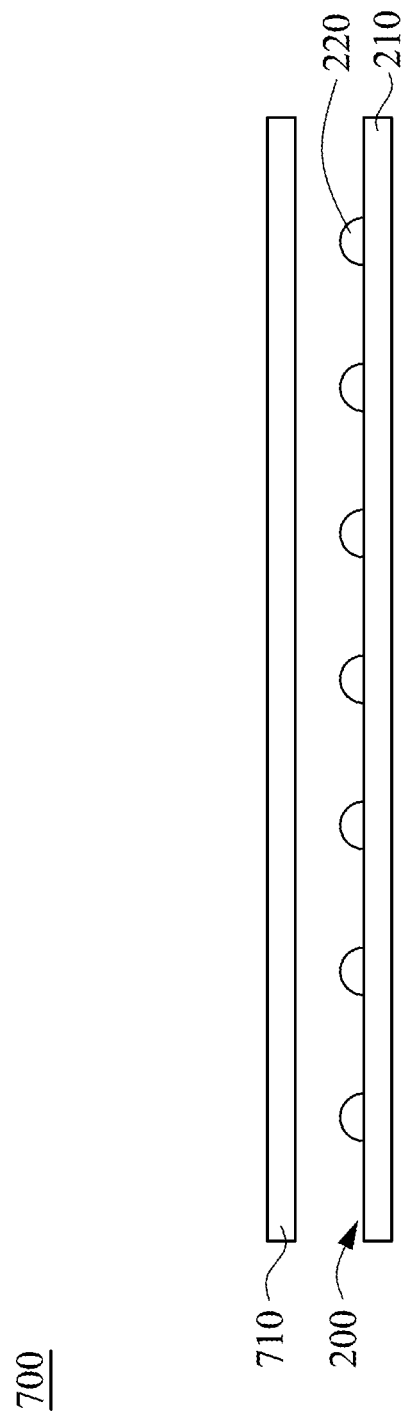
FIG. 21 is a schematic structural diagram showing a backlight module in accordance with an embodiment of the present disclosure.

Referring to FIG. 21, FIG. 21 is a schematic structural diagram showing a backlight module 700 in accordance with an embodiment of the present disclosure. The backlight module 700 of the present embodiment includes the light source module 200 as shown in FIG. 3 and at least one optical film 710. The optical film 710 is disposed on the light source module 200, and light generated from the light source module 200 enters the optical film 710 to emit from the optical film 710. In the present embodiment, the shape of the optical film 710 is corresponding to the shape of the substrate 210 of the light source module 200, and the optical film 710 covers a viewable area of the light source module 200. It is noted that, the light source module 200 shown in FIG. 3 is merely used as an example which can be applied to the backlight module 700 for explanation, and embodiments of the present disclosure are not limited thereto. In other embodiments, other light source modules, such as the light source module 400 as shown in FIG. 12, or the light source module 600 as shown in FIG. 8 also can be applied to a backlight module, so as to achieve the same effect.

Figure 22:
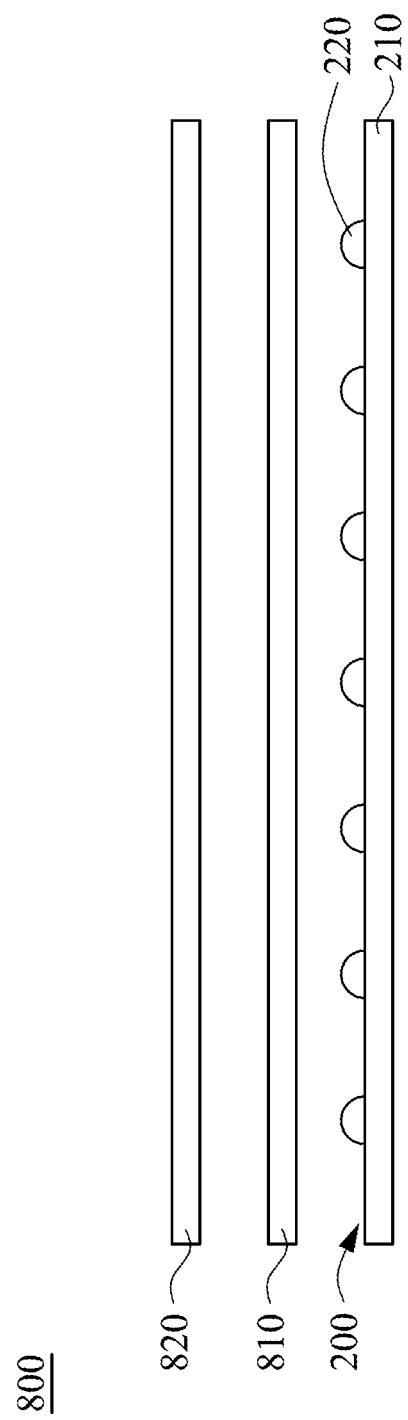
FIG. 22 is a schematic structural diagram showing a display device in accordance with an embodiment of the present disclosure.

Referring to FIG. 22, FIG. 22 is a schematic structural diagram showing a display device 800 in accordance with an embodiment of the present disclosure. The display device 800 of the present embodiment includes the light source module 200 as show in FIG. 3, at least one optical film 810 and a display panel 820. The optical film 810 is disposed on the light source module 200, and the display panel 820 is disposed on the optical film 810. Therefore, light generated from the light source module 200 can enter the optical film 810 and the display panel 820, and then emit out from the display panel 820. In the present embodiment, the shape of the optical film 810 and the shape of the display panel 820 are corresponding to the shape of the substrate 210 of the light source module 200, and optical film 810 and the display panel 820 covers the viewable area of the light source module 200. It is noted that, the light source module 200 shown in FIG. 3 is merely used as an example which can be applied to the backlight module 700 for explanation, and embodiments of the present disclosure are not limited thereto. In other embodiments, other light source modules, such as the light source module 400 as shown in FIG. 12, or the light source module 600 as shown in FIG. 8 also can be applied to a backlight module, so as to achieve the same effect.

According to the aforementioned embodiments of the present disclosure, the present disclosure uses a light source module desired to be improved as a reference light source module for re-adjusting distances between every two adjacent light-emitting units in the reference light source module according to optical trends generated by the reference light source module, thereby enabling an adjusted light source module to generate light with uniform distribution without increasing the number of light-emitting units. More specifically, in the method of the present disclosure, the light-emitting units closest to a sidewall are fixed in the reference light source module. Thereafter, abovementioned equations are used to calculate the optical trends and target distances between every two adjacent light-emitting units. Then, the distances between every two light-emitting units are adjusted according to the target distance. Therefore, the present disclosure optimizes and uniformize the brightness distribution without increasing the number of light-emitting units and the deployment cost. It is noted that, in the present embodiment, the light source module with light-emitting units arranged at equal intervals is used as the light source module desired to be improved (i.e., the reference light source module). In other embodiments, the reference light source module can also be a light source module with light-emitting units arranged at unequal intervals.

In addition, in conventional light source modules, the light-emitting units are arranged close to each other in a dark area, and the light-emitting units are arranged away from each other in a bright area. For example, if the brightness in one area is 3% less than the brightness in other areas, the distances between any two adjacent light-emitting units in that area are adjusted to be smaller in 3%. Similarly, If the brightness in one area is 5% more than the brightness in other areas, the distances between any two adjacent light-emitting units in that area are adjusted to be greater in 5%. In other words, in the conventional light source module, arrangement distances of light-emitting units are adjusted proportionally according to a brightness difference between an area where the light-emitting units to be adjusted are located and other areas. However, such conventional arrangement of the light-emitting units cannot generate uniform brightness distribution due to the drastic changes of the distances between any two adjacent light-emitting units. In contrast to the present disclosure, the distances between any two light-emitting units are not adjusted with reference to the brightness difference between an area where the light-emitting units to be adjusted are located and other areas, but are adjusted with reference to ratios of brightness values between any two adjacent light-emitting units to an average brightness value. Therefore, the density of the arrangement of the light-emitting units in the present disclosure are not changed drastically, thereby achieving smooth brightness distribution.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the invention. In view of the foregoing, it is intended that the present disclosure cover modifications and variations of this invention provided they fall within the scope of the following claims.

What is claimed is:

1. A method for manufacturing a light source module, the method comprising:
   providing a reference light source module, wherein the reference light source module comprises a substrate and a plurality of light-emitting units arranged on the substrate;
   obtaining a plurality of optical trends between every two adjacent light-emitting units;
   calculating a plurality of optical ratios between every two adjacent light-emitting units, wherein each of the optical ratios is a ratio of each of the optical trends to a total reference optical trend of the reference light source module; and
   calculating a plurality of target distances according to the optical ratios and adjusting a plurality of initial distances between every two adjacent light-emitting units according to the target distances, so as to form a target light source module;
   wherein each of the target distances is defined by the following equation:

$$P'_i = \left(\sum P_i\right) \cdot \frac{f_i}{\sum f_i};$$

wherein $P'_i$, represents each of the target distances, $f_i$ represents the optical trend at an area i between any two adjacent light-emitting units, $P_i$ represents the initial distance at the area i between any two adjacent light-emitting units.

2. The method of claim 1, wherein each of the optical trends is defined by the following equation:

$$f_i = \sqrt{\frac{Br_i}{\overline{Br_s}}};$$

wherein $f_i$ represents the optical trend at the area i between any two adjacent light-emitting units, $Br_i$ represents a brightness value or a luminance value at the area i between any two adjacent light-emitting units, and $\overline{Br_s}$ represents an average brightness value or an average luminance value generated by the reference light source module.

3. The method of claim 1, wherein each of the optical trends is defined by one of the following equations:

$$f_i = \frac{Br_i}{\overline{Br}} \text{ and } f_i = \frac{Br_i}{\sqrt{\frac{\sum_{n=1}^{i} Br_i^2}{n}}};$$

wherein $f_i$ represents the optical trend at the area i between any two adjacent light-emitting units, $Br_i$ represents a brightness value or a luminance value at the area i between any two adjacent light-emitting units which are arranged along a direction, and $\overline{Br}$ represents an average brightness value or an average luminance value generated by the light-emitting units which are arranged along the direction, and n represents the number of spacings between every two adjacent light-emitting units.

4. A backlight module, comprising:
   the light source module manufactured by the method of claim 1; and
   an optical film disposed on the light source module.

5. The backlight module of claim 4, wherein the substrate of the light source module has a shape of a rectangle, a circle, an oval or a fan-shape, and the shape of the optical film corresponds to the shape of the substrate.

6. The backlight module of claim 4, wherein the target distances between every two adjacent light-emitting units are not all equal.

7. The backlight module of claim 4, wherein the target distances between every two adjacent light-emitting units located closer to side edges of the substrate are smaller than the target distances between every two adjacent light-emitting units located closer to a central area of the substrate.

8. A display device, comprising:
   a backlight module of claim 4; and
   a display panel disposed on the optical film.

9. A method for manufacturing a light source module, the method comprising:
   providing a reference light source module, wherein the reference light source module comprises a substrate and a plurality of light-emitting units arranged on the substrate, wherein the light-emitting units are arranged along a first direction to form a plurality of rows, and the light-emitting units are arranged along a second direction to form a plurality of columns;
   respectively obtaining a plurality of optical trends between every two adjacent light-emitting units in each row and in each column;
   calculating a plurality of optical ratios between every two adjacent light-emitting units, wherein each of the optical ratios is a ratio of each of the optical trends to a total reference optical trend of the reference light source module; and
   calculating a plurality of target distances corresponding to every two adjacent light-emitting units in each row and in each column according to the optical ratios, and adjusting a plurality of initial distances between every two adjacent light-emitting units in each row along the first direction according to the target distances, and adjusting a plurality of initial distances between every two adjacent light-emitting units in each column along the second direction according to the target distances, thereby forming a target light source module.

10. The method of claim 9, wherein each of the optical trends is defined by one of the following equations:

$$f_i = \sqrt{\frac{Br_i}{\overline{Br_s}}}\ ;\ f_i = \frac{Br_i}{\overline{Br}};\ \text{and}\ f_i = \frac{Br_i}{\sqrt{\frac{\sum_{n=1}^{i} Br_i^2}{n}}};$$

wherein $f_i$ represents the optical trend at an area i between any two adjacent light-emitting units, $Br_i$ represents a brightness value or a luminance value at the area i between any two adjacent light-emitting units in each rows and in each column, and $\overline{Br_s}$ represents an average brightness value or an average luminance value generated by the light-emitting units in each row and in each column, and n represents the number of spacings between every two adjacent light-emitting units.

11. The method of claim 9, wherein each of the target distances is defined by the following equation:

$$P'_i = \left(\sum P_i\right) \cdot \frac{f_i}{\sum f_i};$$

wherein $P'_i$ represents each of each of the target distances, $f_i$ represents the optical trend at an area i between any two adjacent light-emitting units, $P_i$ represents the initial distance at the area i between any two adjacent light-emitting units in each of the rows and the columns.

12. A light source module, comprising:
a substrate; and
a plurality of light-emitting units disposed on the substrate;
wherein the light source module has a total reference optical trend and a plurality of optical trends, each of the optical trends is obtained from an area between any two adjacent light-emitting units, and the total reference optical trend is the sum of the optical trends, wherein there are a plurality of target distances between every two adjacent light-emitting units, and ratios of each of the target distances to a total distance of the light-emitting units are defined according to a plurality of optical ratios between every two adjacent light-emitting units, wherein the optical ratios are defined by a ratio of each of the optical trends to the total reference optical trend and
wherein each of the target distances is defined by the following equation:

$$P'_i = \left(\sum P_i\right) \cdot \frac{f_i}{\sum f_i};$$

wherein $P'_i$ represents each of the target distances, $f_i$ represents the optical trend at an area i between any two adjacent light-emitting units, $P_i$ represents an initial distance at the area i between any two adjacent light-emitting units.

13. The light source module of claim 12, wherein each of the optical trends is defined by the following equation:

$$f_i = \sqrt{\frac{Br_i}{\overline{Br_s}}}\ ;$$

wherein $f_i$ represents the optical trend at the area i between any two adjacent light-emitting units, $Br_i$ represents a brightness value or a luminance value at the area i between any two adjacent light-emitting units, and $\overline{Br_s}$ represents an average brightness value or an average luminance value generated by the reference light source module.

14. The light source module of claim 12, wherein each of the optical trends is defined by one of the following equations:

$$f_i = \frac{Br_i}{\overline{Br}};\ \text{and}\ f_i = \frac{Br_i}{\sqrt{\frac{\sum_{n=1}^{i} Br_i^2}{n}}};$$

wherein $f_i$ represents the optical trend at the area i between any two adjacent light-emitting units, $Br_i$ represents a brightness value or a luminance value at the area i between any two adjacent light-emitting units which are arranged along a direction, and $\overline{Br_s}$ represents an average brightness value or an average luminance value generated by the light-emitting units which are arranged along the direction, and n represents the number of spacings between every two adjacent light-emitting units.

15. A backlight module, comprising:
the light source module of claim 12; and
an optical film disposed on the light source module.

16. The backlight module of claim 15, wherein the substrate of the light source module has a shape of rectangle, a circle, an oval or a fan-shape, and the shape of the optical film corresponds to the shape of the substrate.

17. The backlight module of claim 15, wherein the target distances between two adjacent light-emitting units are not all equal.

18. The backlight module of claim 15, wherein the target distances between every two adjacent light-emitting units located closer to side edges of the substrate are smaller than the target distances between every two adjacent light-emitting units located closer to a central area of the substrate.

19. A light source module, comprising:
a substrate; and
a plurality of light-emitting units disposed on the substrate;
wherein the light source module has a total reference optical trend and a plurality of optical trends, the optical trends are obtained from locations between any every adjacent light-emitting units arranged in a same row or a same column, and the total reference optical trend is the sum of the optical trends in the same row or the same column, wherein there are a plurality of target distances between every two adjacent light-emitting units in the same row or in the same column, and ratios of each of the target distances to a total distance of the light-emitting units in the same row or the same column are defined according to a plurality of optical ratios between every two adjacent light-emitting units, wherein the optical ratios are defined by a ratio of each of the optical trends to the total reference optical trend;

wherein each of the target distances is defined by the following equation:

$$P'_i = \left(\sum P_i\right) \cdot \frac{f_i}{\sum f_i};$$

wherein $P'_i$ represents each of the target distances, $f_i$ represents the optical trend at an area i between any two adjacent light-emitting units, $P_i$ represents an initial distance at the area i between any two adjacent light-emitting units in each of the rows or each of the columns.

20. The light source module of claim 19, wherein each of the optical trends is defined by one of the following equations:

$$f_i = \sqrt{\frac{Br_i}{\overline{Br_s}}}; \; f_i = \frac{Br_i}{\overline{Br}}; \text{ and } f_i = \frac{Br_i}{\sqrt{\frac{\sum_{n=1}^{i} Br_i^2}{n}}};$$

wherein $f_i$ represents the optical trend at the area i between any two adjacent light-emitting units, $Br_i$ represents a brightness value or a luminance value at the area i between any two adjacent light-emitting units in each row or in each column, and $\overline{Br}$ represents an average brightness value or an average luminance value generated by the light-emitting units in each row or in each column, and n represents the number of spacings between every two adjacent light-emitting units.

* * * * *